United States Patent [19]

Salè

[11] 3,853,903
[45] Dec. 10, 1974

[54] SUBSTITUTED 2-BENZOYLISOXAZOLIDINES

[75] Inventor: Amedeo Omodei Salè, Voghera, Italy

[73] Assignee: Gruppo Lepetit S.p.A., Milan, Italy

[22] Filed: June 29, 1973

[21] Appl. No.: 374,854

[30] Foreign Application Priority Data
Aug. 17, 1972 Italy.................................. 28245/72

[52] U.S. Cl.............................. 260/307 F, 424/272
[51] Int. Cl.............................................. C07d 85/08
[58] Field of Search.............................. 260/307 FA

[56] References Cited
UNITED STATES PATENTS
3,696,096 10/1972 Pifferi............................ 260/240 J OTHER PUBLICATIONS
Pifferi et al., J. Med. Chem., 1972, 15(8), 851–853.

Primary Examiner—Raymond V. Rush
Attorney, Agent, or Firm—Theodore Post; C. Kenneth Bjork

[57] ABSTRACT

2-Benzoylisoxazolidines of the formula

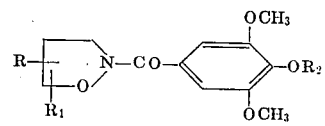

wherein R and $R_1$ each independently represents lower alkyl, carbo-lower alkoxy or phenyl or one of which additionally is hydrogen, and $R_2$ represents lower alkyl or lower acyl.

The compounds of the invention have central nervous system (CNS) activity, essentially characterized by long-lasting hypnotic, sedative and myorelaxing effects. The compounds also display a strong anxiety relieving effect.

4 Claims, No Drawings

SUBSTITUTED 2-BENZOYLISOXAZOLIDINES

BACKGROUND OF THE INVENTION

Substituted 2-benzoyl- and 2-cinnamoyl-isoxazolidines of the formula

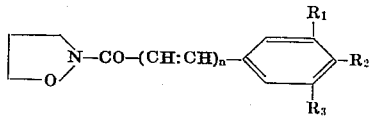

wherein *n* is zero or one, and $R_1$, $R_2$ and $R_3$ independently are hydrogen, hydroxy, a 1 to 3 carbon alkoxy or an acetoxy group, wherein no more than one of such groups is hydrogen are known; U.S. Pat. No. 3,696,096. These compounds differ from those herein claimed in that they have no substitution on the isoxazolidine ring. The known compounds do not have long-lasting hypnotic, sedative and myorelaxing activity, unlike the compounds herein claimed.

SUMMARY OF THE INVENTION

This invention is concerned with substituted 2-benzoylisoxazolidines corresponding to the formula

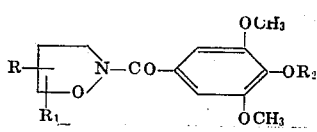

wherein R and $R_1$ each independently represents lower alkyl, carbo-lower alkoxy or phenyl, or one of which additionally represents hydrogen, and $R_2$ represents lower alkyl or lower acyl. Compounds wherein neither R nor $R_1$ represents hydrogen form a sub-group of the novel compounds. As used in the specification and claims, the terms "lower alkyl" and "lower acyl" designate respectively, alkyl and acyl moieties containing from 1, to 2, to 3, to 4, to 5, to 6 carbon atoms such as methyl, ethyl, propyl, butyl, pentyl, hexyl; and formyl, acetyl, propionyl, butyryl, pentanoyl and hexanoyl, respectively. The term "lower alkoxy" represents an alkoxy group containing from 1, to 2, to 3, to 4, to 5 carbon atoms such as methoxy, ethoxy, propoxy, butoxy and pentoxy.

DESCRIPTION OF THE PREFERRED EMBODIMENTS

The following exemplary details further describe the invention and the manner and process of making and using it to enable the art skilled to make and use the same and set forth the best mode contemplated by the inventor of carrying out the invention.

The compounds of the invention are prepared by contacting an isoxazolidine of the formula

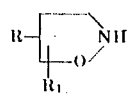

wherein R and $R_1$ have the above meaning, either as free base or in the form of its mineral acid addition salt, with a substituted benzoyl halide of the formula

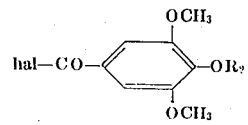

wherein $R_2$ has the significance given before and hal represents a halo group, in the presence of a hydrogen chloride acceptor, advantageously selected from (a) the tertiary aliphatic amines, such as trimethyl amine or triethyl amine, (b) pyridine or (c) the picolines.

The reaction is carried out in an inert organic solvent, such as a lower alkyl halogenated hydrocarbon, tetrahydrofuan and the like, of which methylene chloride is preferred, at a temperature varying from about 0°C. to the boiling temperature of the solvent, and preferably at room temperature as the lower limit. The reaction time ranges from about 2 to about 6 hours and best results are obtained when the reaction is completed within about 3 to about 5 hours. Although the amounts of the reactants are not critical, it is advantageous to use substantially equimolecular proportions of the isoxazolidine derivative and of the benzoyl chloride, whereas the organic nitrogen base acid acceptor is generally employed in the ratio 1.1–1.5 mole for each equivalent of the total acid present at the end of the reaction.

The end products are recovered from the reaction mixture by known procedures and are purified by usual techniques, for example by recrystallization from a suitable solvent, by distillation or by chromatography.

The starting isoxazolidine compounds are prepared as described in the examples, and the benzoyl chlorides are prepared from the corresponding acids pursuant to well-known procedures.

The following non-limitative examples describe in detail compounds illustrative of the present invention and methods for their manufacture.

EXAMPLE 1

3-Methyl-2-(3,4,5-trimethoxybenzoyl)-isoxazolidine a. To a solution of 26 g. (0.25 mole) of N-hydroxyurethane and 54 g. (0.25 mole) of 1,3-dibromobutane in 500 ml. of absolute ethanol, a suspension of 35.7 g. (0.25 mole) of potassium hydroxyurethane in 100 ml. of absolute ethanol is added with stirring at 5°C. and stirring is continued for three hours at the same temperature. Then a solution of 14 g. (0.25 mole) of potassium hydroxide in 100 ml. of absolute ethanol is added dropwise at room temperature; stirring is continued for an hour at room temperature, and subsequently the mixture is refluxed for 3 hours. The solid insoluble mineral salts which form are filtered off and the filtrate is evaporated to dryness under vacuum. The residue is dissolved in diethyl ether, washed twice with a saturated solution of sodium chloride and with dilute sodium hydroxide and dried over sodium sulfate. The solution is evaporated in vacuo and the residue is distilled under reduced pressure. 23.4 Grams of crude 2-carbethoxy-3-methyl-isoxazolidine is obtained, b.p. 110°–112°C./20 mm Hg.

b. A solution of 22.5 g. of the crude 2-carbethoxy-3-methyl-isoxazolidine in 370 ml. of aqueous 18% hydrochloric acid is refluxed for 3 hours. The mixture is then evaporated to dryness in vacuo and the residue, after dissolving in water, is made alkaline with 150 ml. of aqueous 50 percent sodium hydroxide. An oily product separates which is extracted with benzene and the resulting solution is dried over potassium carbonate. The solvent is then evaporated and the residue is distilled under reduced pressure to give 6.65 g. of crude 3-methyl-isoxazolidine, b.p. 75°–90°C./100 mm Hg.

c. To a solution of 6.75 g. of the crude 3-methyl-isoxazolidine and 12 ml. (0.085 mole) of triethylamine in 135 ml. of methylene chloride, a solution of 18 g. (0.078 mole) of 3,4,5-trimethoxybenzoyl chloride in 90 ml. of methylene chloride is added dropwise at 5°–10°C. with stirring. Stirring is continued for an hour at room temperature and 2 hours at reflux. The reaction mixture is then washed with water, hydrochloric acid, dilute sodium hydrogen carbonate and again with water and dried over sodium sulfate. After evaporating the solvent, an oily residue is obtained which is taken up with diisopropyl ether. A solid precipitates which is filtered and recrystallized from diisopropyl ether to give 10.8 g. of 3-methyl-2-(3,4,5-trimethoxybenzoyl)-isoxazolidine, m.p. 83°–84°C.

EXAMPLE 2

2-(4-Acetoxy-3,5-dimethoxybenzoyl)-3-methyl-isoxazolidine

The titular compound is prepared following substantially the same procedure described in Example 1, starting with 3-methyl-isoxazolidine and 4-acetoxy-3,5-dimethoxybenzoyl chloride. Yield 56.4 percent, m.p. 87°–89°C.

EXAMPLE 3

4-Ethyl-2-(3,4,5-trimethoxybenzoyl)-isoxazolidine a. To a solution of sodium hydroxyurethane, prepared by adding at room temperature 34.7 g. (1.15 mole) of an 80 percent oily suspension of sodium hydride to 225 g. (2.14 mole) of N-hydroxyurethane dissolved in 2,600 ml. of anhydrous dimethylformamide, a solution of 226 g. (1.15 mole) of 2-ethyl-1,3-dibromopropane in 600 ml. of anhydrous dimethylformamide is added dropwise with stirring. Stirring is continued for three hours at room temperature, and subsequently 34.7 g. (1.15 mole) of an 80% oily suspension of sodium hydride is added, maintaining the temperature at about 15°–20°C. Stirring is continued for 20 hours at room temperature, then the dimethylformamide is distilled off at 50°C. in vacuo and the residue, dissolved in water, is extracted five times with diethyl ether. The ether solutions are collected, washed with dilute sodium hydroxide and with a saturated aqueous solution of sodium chloride, and dried over sodium sulfate. The oily residue obtained after evaporation of the solvent is distilled to give a crude product which is chromatographed, using benzene and benzene-diethyl ether mixtures as the eluents. From the benzene-diethyl ether fractions, 62.3 g. of 2-carbethoxy-4-ethylisoxazolidine is obtained, b.p. 108°C./1.5 mm Hg.

b. The compound obtained under (a) is hydrolyzed following the procedure of part (b) of Example 1, to give 4-ethyl-isoxazolidine. Yield 62.5%, b.p. 115°–117°C./110–130 mm Hg.

c. The titular compound is obtained by reacting equimolecular amounts of 4-ethyl-isoxazolidine and 3,4,5-trimethoxybenzoyl chloride as described in part (c) of Example 1. Yield 86.5 percent, b.p. 180°–185°C./0.1 mm Hg.

EXAMPLE 4

5-Carbomethoxy-5-methyl-2-(3,4,5-trimethoxybenzoyl)-isoxazolidine

The titular compound is obtained by following the procedure described in part (c) of Example 1, starting with 5-carbomethoxy-5-methyl-isoxazolidine, prepared as described by M. Ochiai, M. Obayashi and K. Morita, Tetrahedron, 23, 2641 (1967), and 3,4,5-trimethoxybenzoyl chloride. Yield 71 percent, b.p. 195°C./0.1 mm Hg.

EXAMPLE 5

2-(4-Acetoxy-3,5-dimethoxybenzoyl)-5-carbomethoxy-5-methyl-isoxazolidine

The titular compound is prepared by following the procedure described in part (c) of Example 1, starting with 5-carbomethoxy-5-methyl-isoxazolidine and 4-acetoxy-3,5-dimethoxybenzoyl chloride. Yield 83.5%, m.p. 98°–99°C. (from absolute ethanol).

EXAMPLE 6

5-Phenyl-2-(3,4,5-trimethoxybenzoyl)-isoxazolidine a. To a suspension of 15.3 g. (0.107 mole) of potassium hydroxyurethane in 100 ml. of absolute ethanol, 14.15 g. (0.051 mole) of 1-phenyl-1,3-dibromopropane is added at room temperature with stirring. Stirring is continued for two hours at room temperature and 2.5 hours at the boiling temperature of the reaction mixture. The inorganic precipitate which forms is filtered off and the filtrate is evaporated to dryness in vacuo. The residue is dissolved in diethyl ether and, upon adding an ether solution of hydrogen chloride, a precipitate forms which, after filtration, gives 1.95 g. of 5-phenyl-isoxazolidine hydrochloride, m.p. 116–122°C. The acidic ether mother liquors are neutralized with aqueous 10 percent sodium hydrogen carbonate, washed with water, dried over sodium sulfate and evaporated to dryness. The oily residue is distilled under reduced pressure, giving 4 g. of 2-carbethoxy-5-phenyl-isoxazolidine, b.p. 115°–130°C./0.1 mm Hg.

b. To a solution of 3.35 g. of 2-carbethoxy-5-phenyl-isoxazolidine in 28 ml. of absolute ethanol, a solution of 1.1 g. of potassium hydroxide in 2.8 ml. of water is added and the mixture is allowed to stand at room temperature for 24 hours. Then the ethanol is evaporated in vacuo and the residue is dissolved in methylene chloride. The resulting solution is washed with water and dried over sodium sulfate, the solvent is evaporated off and the residue, dissolved in a small amount of absolute ethanol, is treated with an alcoholic solution of hydrochloric acid. Upon dilution with diethyl ether, 1 g. of 5-phenyl-isoxazolidine hydrochloride precipitates, m.p. 128°–131°C.

c. To a mixture of 1.4 g. (0.0075 mole) of 5-phenyl-isoxazolidine hydrochloride and 2.5 ml. (0.018 mole) of triethylamine in 15 ml. of methylene chloride, a solution of 1.75 g. (0.0075 mole) of 3,4,5-trimethoxybenzoyl chloride in 10 ml. of methylene chloride is added dropwise with stirring. The reaction mixture is refluxed three hours with stirring, then it is washed with dilute hydrochloric acid, with dilute sodium hydrogen carbonate, with water and dried over sodium sulfate. After evaporating the solvent, the oily residue is dissolved in 40 ml. of diisopropyl ether and the resulting solution is refluxed two hours, insoluble matter filtered off and the solution concentrated to dryness in vacuo, to give 2.3 g. of 5-phenyl-2-(3,4,5-trimethoxybenzoyl)-isoxazolidine as a pure, dense, undistillable oil.

EXAMPLE 7

3-Phenyl-2-(3,4,5-trimethoxybenzoyl)-isoxazolidine a. To a solution of 14.6 g. (0.1 mole) of potassium hydroxyurethane and 10.5 g. (0.1 mole) of N-hydroxyurethane in 100 ml. of anhydrous dimethylformamide, a solution of 19.7 g. (0.1 mole) of β-bromomethyl-styrene dissolved in 40 ml. of anhydrous dimethylformamide is added with stirring. Stirring is continued for half an hour, then the solvent is evaporated in vacuo and the residue is dissolved in diethyl ether. The obtained solution is washed with aqueous 5 percent sodium hydroxide and with water, dried over sodium sulfate and the solvent is evaporated off. The residue is recrystallized from diisopropyl ether to yield 19 g. of N-carbethoxy-0-cinnamyl-hydroxylamine, m.p. 59–61°C.

b. To a saturated solution of hydrogen bromide in 750 ml. of methylene chloride, 15.5 g. of N-carbethoxy-0-cinnamyl-hydroxylamine dissolved in 75 ml. of methylene chloride is added at 0°C. The mixture is kept for two hours at 0°C. and allowed to stand overnight at room temperature. Then the solvent is evaporated off to give 26.9 g. of crude oily N-carbethoxy-0-(3-bromo-3-phenylpropyl)-hydroxylamine, which is employed as such for the subsequent step.

c. A solution of 2.35 g. of the crude product of part (b) in 10 ml. of dimethylformamide is added with stirring to a solution of 1.8 ml. of N-methylpiperidine dissolved in 30 ml. of dimethylformamide. Stirring is continued for 2 hours at room temperature and for two hours at 50°C. Then the mixture is poured into 160 ml. of water, extracted three times with diethyl ether and the ether solutions are collected and washed with dilute hydrochloric acid, dilute sodium hydrogen carbonate and water, and dried over sodium sulfate. The solvent is evaporated in vacuo and the residue is distilled under reduced pressure to give 0.46 g. of 2-carbethoxy-3-phenyl-isoxazolidine, b.p. 115°C./0.2 mm Hg.

d. Following substantially the same procedure described in part (b) of Example 6 and starting with 0.81 g. of 2-carbethoxy-3-phenyl-isoxazolidine, 0.12 g. of 3-phenyl-isoxazolidine hydrochloride is obtained, m.p. 147-150°C. (from a mixture of absolute ethanol and diethyl ether).

e. By substantially the same procedure described under part (c) of Example 6, starting with 3-phenyl-isoxazolidine hydrochloride and 3,4,5-trimethoxybenzoyl chloride, 0.12 g. of 3-phenyl-2-(3,4,5-trimethoxybenzoyl)-isoxazolidine is obtained, m.p. 91–93°C. (from diisopropyl ether).

The compounds of the invention proved active on the central nervous system, said activity being essentially characterized by long-lasting hypnotic, sedative and myorelaxing effects. These compounds display also a strong anxiety relieving effect. These properties were evaluated after administrations to mice and rats of effective amounts of the compounds. An impairment of motor coordination and righting reflex after such administrations was taken as a measure of the hypnotic effect, whereas a decreasing of the spontaneous activity was related to the sedative properties. The myorelaxing activity was evaluated by considering the muscular tone, and the anxiety relieving effect was measured on the basis of the secondary conditioned avoidance response. In representative experiments, amounts from about 20 to about 50 mg/kg i.p. of compounds of Examples 1, 3, 5, 6 and 7 were found to be active on the above mentioned parameters. Moreover, these favorable biological characteristics are generally coupled with a very low toxicity since the $LD_{50}$ values in mice are higher than 600 mg/kg i.p.

What I claim is:

1. A 2-benzoyl-isoxazolidine which is 2-(4-acetoxy-3,5-dimethoxybenzoyl)-5-carbomethoxy-5-methyl-isoxazolidine, 5-phenyl-2-(3,4,5-trimethoxybenzoyl)-isoxazolidine, or 3-phenyl-2-(3,4,5-trimethoxybenzoyl)-isoxazolidine.

2. The compound of claim 1 which is 2-(4-acetoxy-3,5-dimethoxybenzoyl)-5-carbomethoxy-5-methyl-isoxazolidine.

3. The compound of claim 1 which is 5-phenyl-2-(3,4,5-trimethoxybenzoyl)-isoxazolidine.

4. The compound of claim 1 which is 3-phenyl-2-(3,4,5-trimethoxybenzoyl)-isoxazolidine.

* * * * *

UNITED STATES PATENT OFFICE
CERTIFICATE OF CORRECTION

PATENT NO. : 3,853,903
DATED : December 10, 1974
INVENTOR(S) : Amedeo Omodei Sale'

It is certified that error appears in the above-identified patent and that said Letters Patent are hereby corrected as shown below:

Column 2, the formula between lines 5 and 10 should read

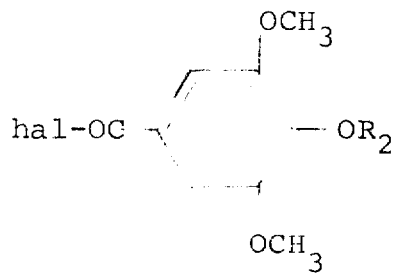

Column 2, line 19, "tetrahydrofuan" should read -- tetrahydrofuran --.

Signed and Sealed this twenty-second Day of July 1975

[SEAL]

Attest:

RUTH C. MASON
Attesting Officer

C. MARSHALL DANN
Commissioner of Patents and Trademarks